United States Patent
Yokota et al.

(10) Patent No.: US 7,836,330 B2
(45) Date of Patent: Nov. 16, 2010

(54) STREAM DISTRIBUTION SYSTEM AND FAILURE DETECTION METHOD

(75) Inventors: Daisuke Yokota, Odawara (JP); Aritoki Takada, Odawara (JP); Tadashi Takeuchi, Sagamihara (JP); Yoshihiro Hayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 301 days.

(21) Appl. No.: 12/140,650

(22) Filed: Jun. 17, 2008

(65) Prior Publication Data

US 2009/0271656 A1  Oct. 29, 2009

(30) Foreign Application Priority Data

Apr. 25, 2008  (JP)  ............................. 2008-115001

(51) Int. Cl.
  *G06F 11/00* (2006.01)
(52) U.S. Cl. .......................................................... 714/4
(58) Field of Classification Search .................... 714/4, 714/43
  See application file for complete search history.

(56) References Cited

U.S. PATENT DOCUMENTS 5,987,621 A * 11/1999 Duso et al. ..................... 714/4
7,159,234 B1 * 1/2007 Murphy et al. ................ 725/87
2003/0142670 A1 * 7/2003 Gould et al. ................. 370/390
2004/0153709 A1 * 8/2004 Burton-Krahn ................ 714/4
2006/0248212 A1 * 11/2006 Sherer et al. ................. 709/231
2006/0253728 A1 * 11/2006 Gemon ......................... 714/4
2008/0056123 A1 * 3/2008 Howard et al. ............... 370/225
2008/0104266 A1 * 5/2008 Dekel et al. .................. 709/231
2008/0256384 A1 * 10/2008 Branson et al. ................ 714/4
2009/0063509 A1 * 3/2009 Lockhart et al. .............. 707/10
2009/0181775 A1 * 7/2009 Nilsson et al. ................ 463/42
2010/0138531 A1 * 6/2010 Kashyap ..................... 709/224

FOREIGN PATENT DOCUMENTS

JP  2002-152203  5/2002

\* cited by examiner

*Primary Examiner*—Marc Duncan
(74) *Attorney, Agent, or Firm*—Brundidge & Stranger, P.C.

(57) ABSTRACT

Provided are a stream distribution system and a failure detection method capable of easily identifying the cause of quality loss in stream distribution. This stream distribution system includes a first server for communicating with a client terminal via a router and sending stream data, and a second server configured as a redundant server of the first server and connected to the first server. The first server has a communication status notification unit for sending a connection management table concerning the communication with the client terminal to the second server. The second server has a packet recording unit for acquiring a mirror packet, which is a copy of a packet sent to the first server, from the router, and a network failure monitoring unit for detecting a failure in a network between the first server and the client terminal based on the connection management table and a packet buffer.

10 Claims, 8 Drawing Sheets

FIG.3

11 CONNECTION MANAGEMENT TABLE

| 201<br>DISTRIBUTION INFORMATION | 202<br>REQUIRED BAND | 203<br>CLIENT TERMINAL IDENTIFYING INFORMATION | 204<br>RECEIVED PACKETS | 205<br>COMMUNICATION STATUS |
|---|---|---|---|---|
| REQUESTED STREAM (MOVIE 1) | 1Mbps | ADDRESS 192.168.1.1 PORT NUMBER 1000 | 4,585 RECEPTIONS, PACKET INFORMATION, RECEIVED TIME | TCP WINDOW SIZE 64000, MAXIMUM DELAY 20ms, BAND 1Mbps, 0 RESENT PACKETS |
| REQUESTED STREAM (MOVIE 2) | 2Mbps | ADDRESS 192.169.1.2 PORT NUMBER 1001 | 554 RECEPTIONS, PACKET INFORMATION, RECEIVED TIME | TCP WINDOW SIZE 0, MAXIMUM DELAY 1200ms, BAND 0Mbps, 0 RESENT PACKETS |
| REQUESTED STREAM (MOVIE 3) | 3Mbps | ADDRESS 192.170.1.3 PORT NUMBER 1002 | 745 RECEPTIONS, PACKET INFORMATION, RECEIVED TIME | NORMAL END |

19 CONNECTION ANALYSIS TABLE

| CLIENT TERMINAL IDENTIFYING INFORMATION (211) | BUFFERING PACKET INFORMATION (212) |
|---|---|
| ADDRESS 192.168.1.1 PORT NUMBER 1000 | 4,585 PACKETS RECEIVED |
| ADDRESS 192.169.1.2 PORT NUMBER 1001 | 554 PACKETS RECEIVED |
| ADDRESS 192.170.1.3 PORT NUMBER 1002 | 745 PACKETS RECEIVED |

STREAM DISTRIBUTION SYSTEM AND FAILURE DETECTION METHOD

CROSS-REFERENCES

This application relates to and claims priority from Japanese Patent Application No. 2008-115001, filed on Apr. 25, 2008, the entire disclosure of which is incorporated herein by reference.

BACKGROUND

The present invention relates to a stream distribution system and a failure detection method capable of detecting a failure in stream distribution.

Conventionally, as a method of analyzing a failure in a network, a method has been proposed for monitoring a network path failure from a client terminal by way of polling, and thereby determining where a failure has occurred in the network path (for instance, refer to Japanese Patent Laid-Open Publication No. 2002-152203).

SUMMARY

Nevertheless, although this conventional method can be used in cases where the client terminal, server and network path are fixed, it cannot be used in cases when there is an unspecified number of client terminals such as in stream distribution. In addition, if the network path is complicated, polling will increase the traffic, and it will become difficult to balance the monitoring frequency and the increased traffic for monitoring.

Meanwhile, the further increase of Internet stream distribution services is anticipated, and the distribution band expansion of stream distribution servers and its utilization in a wide-area network are expected. At the same time, reduction of the server installation area, reduction of power consumption and improvement in the processing performance of individual servers are demanded.

With stream distribution where a stream distribution server sends stream data via a complex network, since a single distribution band handles large stream data, if a failure occurs in that network, a sophisticated failure analyzer is required to perform failure analysis. Moreover, since a failure analyzer needs to understand the complex behavior of the stream distribution just to check the occurrence of a failure, it is extremely difficult to analyze a network failure in stream distribution.

In addition, since stream distribution needs to guarantee the distribution band, if there is quality loss in stream distribution caused by the distribution band falling below the required band or other reasons, it is necessary to detect such quality loss and analyze the cause thereof. Nevertheless, as the cause of quality loss in stream distribution, in addition to a failure occurring in the network, numerous causes such as a failure in the stream distribution server or a failure in the client terminal could be considered, and it is difficult to identify the cause of quality loss.

The present invention was made in view of the foregoing problems. Thus, an object of this invention is to provide a stream distribution system and a failure detection method capable of easily identifying the cause of quality loss in stream distribution.

In order to achieve the foregoing object, the present invention provides a stream distribution system comprising a first stream distribution server for communicating with a client terminal via a network apparatus and sending stream data, and a second stream distribution server configured as a redundant server of the first stream distribution server and connected to the first stream distribution server. The first stream distribution server includes a send unit configured to send communication information concerning the communication with the client terminal to the second stream distribution server. The second stream distribution server includes an acquisition unit configured to acquire mirror data, which is a copy of data sent to the first stream distribution server, from the network apparatus, and a network failure detection unit configured to detect a failure in a network between the first stream distribution server and the client terminal based on the communication information and the mirror data.

In order to achieve the foregoing object, the present invention additionally provides a failure detection method for use in a system including a first stream distribution server for communicating with a client terminal via a network apparatus and sending stream data, and a second stream distribution server configured as a redundant server of the first stream distribution server and connected to the first stream distribution server. This failure detection method includes a send step of the first stream distribution server sending communication information concerning the communication with the client terminal to the second stream distribution server, an acquisition step of the second stream distribution server acquiring mirror data, which is a copy of data sent to the first stream distribution server, from the network apparatus, and a network failure detection step of the second stream distribution server detecting a failure in a network between the first stream distribution server and the client terminal based on the communication information and the mirror data.

According to the present invention, a failure in a network between the first stream distribution server and the client terminal is detected based on communication information concerning the communication between the first stream distribution server and the client terminal, and mirror data as a copy of data sent to the first stream distribution server. Thereby, the second stream distribution server is able to detect quality loss caused by a network failure based on the communication information and mirror data, and differentiate a network failure from other failures.

According to the present invention, the second stream distribution server is able to detect quality loss caused by a network failure based on the communication information and mirror data, and differentiate a network failure from other failures. Thereby, it is possible to narrow the scope of cause of quality loss, and the cause of quality loss in stream distribution can be easily identified. Moreover, since the second stream distribution server having the same level of performance as the first stream distribution server detects the network failure, a network failure can be analyzed without requiring a sophisticated failure analyzer as with the conventional art.

DESCRIPTION OF DRAWINGS

FIG. 3 is a configuration diagram explaining a connection management table shown in FIG. 1;

DETAILED DESCRIPTION

An embodiment of the present invention is now explained in detail with reference to the attached drawings.

Figure 1:
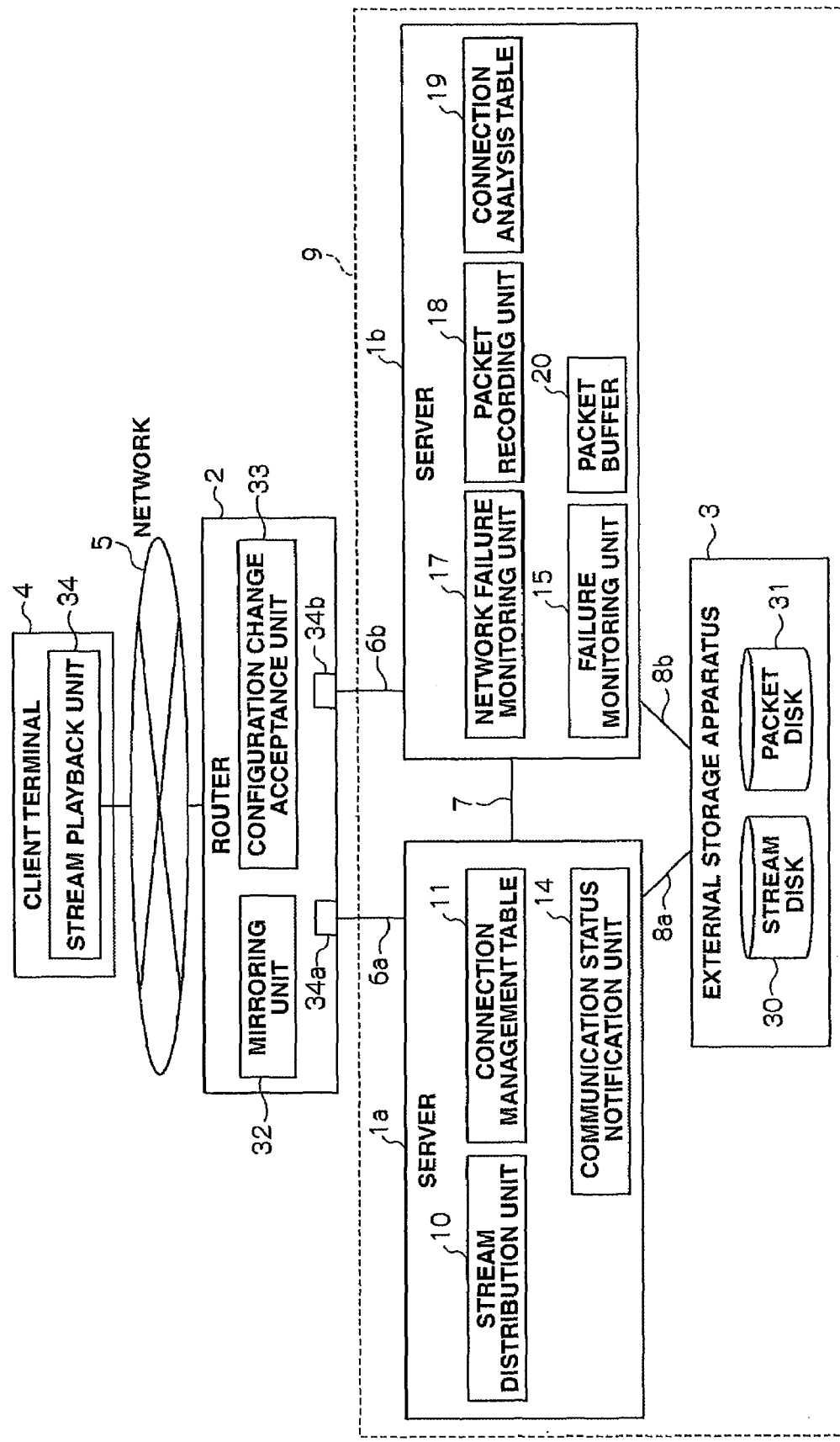
FIG. 1 is schematic configuration diagram explaining the overall configuration of a stream distribution system.

The configuration of a stream distribution system is foremost explained with reference to FIG. 1 through FIG. 5. FIG. 1 is a schematic configuration diagram explaining the overall configuration of the stream distribution system.

A stream distribution server 9 is configured from a stream distribution server (hereinafter simply referred to as a "server") 1*a*, a server 1*b*, and an external storage apparatus 3. The server 1*a* and the server 1*b* respectively communicate with a client terminal 4 connected via a router 2 and a network 5, and send stream data of the stream designated by the client terminal 4.

The client terminal 4 is a terminal for receiving stream data sent by the server 1*a* or the server 1*b*, and providing a stream-viewing service to a user of the client terminal 4. The client terminal 4 includes a stream playback unit 34 for sending a stream distribution request to the server 1*a* or the server 1*b* via the network 5, receiving stream data from the server 1*a* or the server 1*b*, and playing and providing the stream to the user of the client terminal 4. The client terminal 4 also includes an input device (not shown) for receiving operations from the user and a device (not shown) for displaying video. Although only one client terminal 4 is shown in FIG. 1, the configuration is not limited thereto, and there may be a plurality of client terminals.

Before sending the stream distribution request, the client terminal 4 acquires a list of streams distributable by the server 1*a* and the server 1*b*, and the address on the network 5 (for instance the IP address) of the server 1*a* and the server 2*a* to distribute the stream from a Web server (not shown) or the like. The client terminal 4 also prefetches a given period of time worth of stream data in advance during the reception of the stream data. If a reception failure occurs during the reception of stream data from the server 1*a*, and it is not possible to receive subsequent stream data from the server 1*a* within the given period of time that stream data was prefetched, the client terminal 4 sends a stream distribution request for the subsequent stream data to the server 1*b* based on the acquired address of the server 1*b*.

The network 5 is configured from a WAN (Wide Area Network) or the Internet.

The router 2 comprises a network port 34*a* and a network port 34*b* for connecting to other network devices such as the server 1*a* and the server 1*b*. The router 2 also includes a mirroring unit 32 for copying a packet to be sent to a network port and sending the copied mirror packet to other network ports, and a configuration change acceptance unit 33 for accepting an external configuration change and changing the operational configuration of the router 2.

In this embodiment, the router 2 is configured such that the network port 34*a* and the server 1*a* are connected with a network cable 6*a*, and the network port 34*b* and the server 1*b* are connected with a network cable 6*b*. The service provider providing the stream distribution service owns and managed the router connected to the network 5, and the server 1*a* and the server 1*b* connected to the router 2.

An interface cable 7 for acquiring information concerning the mutual operational status is provided between the server 1*a* and the server 1*b*. The server 1*a* and the server 1*b* share the external storage apparatus 3 storing stream data of the stream to be distributed, and are connected to the external storage apparatus 3 with an interface cable 8*a* and an interface cable 8*b*. The interface cable 8*a* and the interface cable 8*b* are preferably configured from a fibre channel cable or the like.

The external storage apparatus 3 is configured from a stream disk 30 as a disk storing stream data of the stream to be distributed by the server 1*a* and the server 1*b*, and a packet disk 31 as a disk storing a mirror packet as a copy of a packet acquired with a packet recording unit 18 described later and sent from the router 2 to the server 1*a*.

Figure 2:
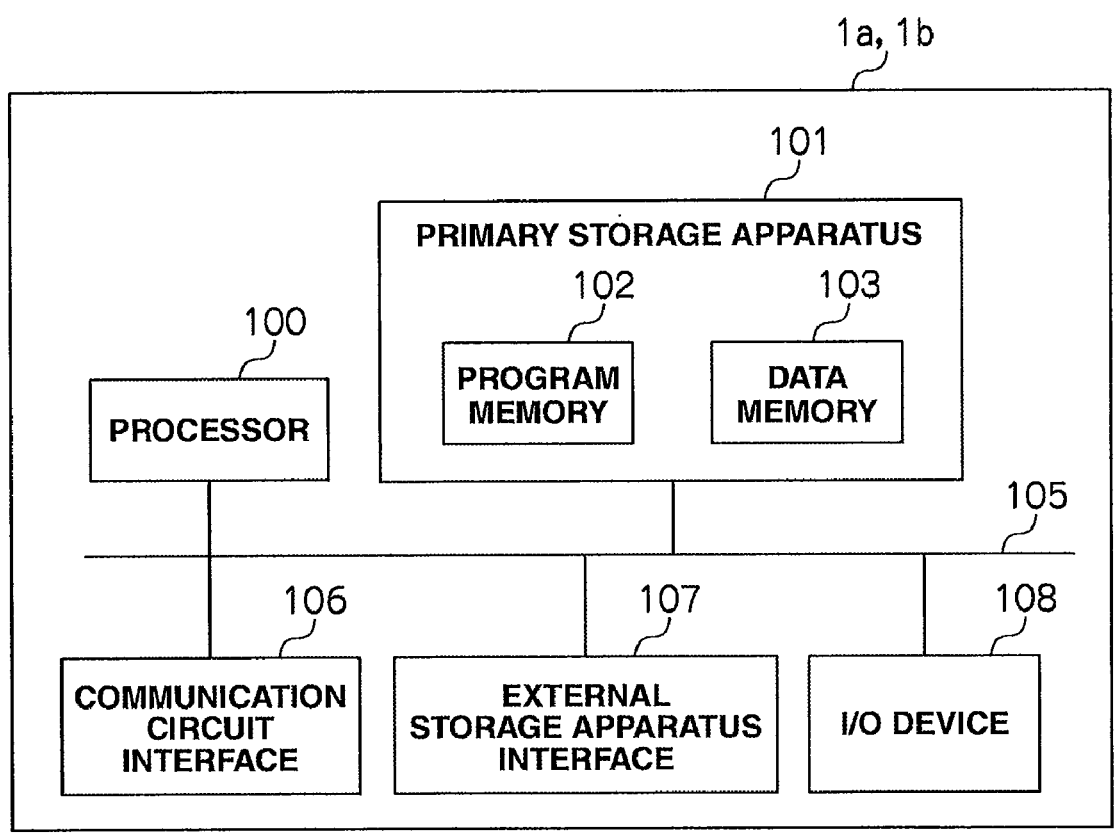
FIG. 2 is a schematic configuration diagram explaining the physical configuration of a server shown in FIG. 1.

FIG. 2 is a schematic configuration diagram explaining the physical configuration of the servers shown in FIG. 1. The server 1*a* and the server 1*b* respectively include a processor 100, a primary storage apparatus 101, an internal interface 105, a communication circuit interface 106, an external storage apparatus interface 107, and an I/O device 108. The primary storage apparatus 101 is configured from a RAM (Random Access Memory) or the like, and comprises a program memory 102 and a data memory 103 as the storage means to be used upon performing arithmetic processing. Arithmetic processing is realized by the processor 100 configured from a CPU (Central Processing Unit) executing a program in the program memory 102. The I/O device 108 is, for instance, a keyboard, a mouse and a display.

The server 1*a* and the server 1*b* are adopting the active/standby configuration. In other words, the server 1*a* and the server 1*b* are in the operating mode status of either active or standby. The server in the active operating mode provides the stream distribution service, and the server in the standby operating mode monitors the occurrence of a failure in the server in the active operating mode and, if a failure occurs in the server in the active operating mode, continues the stream distribution service by changing its operating mode from standby to active. In the ensuing explanation, unless it is otherwise specified herein, let it be assumed that the server 1*a* is in the active operating mode and the server 1*b* is in the standby operating mode.

As shown in FIG. 1, the server 1*a* includes a stream distribution unit 10, a connection management table 11, and a communication status notification unit 14 that operate in a server in the active operating mode. The server 1*b* includes a failure monitoring unit 15, a network failure monitoring unit 17, a packet recording unit 18, and a connection analysis table 19, and a packet buffer 20 that operate in a server in the standby operating mode. Incidentally, although FIG. 1 illustrates components in the server 1*a* that operate in a server in the active operating mode and components in the server 1*b* that operate in a server in the standby operating mode, respectively, since active/standby must be switched if a failure occurs in the server, in a practical sense, the server 1*a* and the server 1*b* include components that operate in both a server in the active operating mode and a server in the standby operating mode.

The stream distribution unit 10 is used for distributing stream data to the client terminal 4 via the network 5. The stream distribution unit 10 acquires stream data from the external storage apparatus 3 according to the stream distribution request from the client terminal 4, and sends the acquired stream data to the client terminal 4 while protecting the transmission band required for playing the stream without interruption.

The connection management table 11 is a table for managing the communication information concerning the communication with the client terminal 4 for each connection with the client terminal 4.

FIG. 3 is a configuration diagram explaining the connection management table shown in FIG. 1. The connection management table 11 is a table to be recorded or updated by the stream distribution unit 10. The connection management table 11 is configured from a distribution information column 201, a required band column 202, a client terminal identifying information column 203, a received packet column 204, and a communication status column 205.

The distribution information column 201 stores, for example, information such as the file name for identifying the stream data stored in the stream disk 30 to be distributed. The required band column 202 stores the transmission band required for playing the stream in the client terminal 4 without interruption. The client terminal identifying information column 203 stores identifying information such as the network address for identifying the client terminal 4 to which stream data should be sent.

The received packet column 204 stores reception information showing the reception status of packets sent to the server 1a; for instance, the number of packets that the server 1a received from the client terminal 4, the time that the last packet was received by the server 1a, and packet information showing the content of the received packet. The packet information to be stored in the received packet column 204 is not limited to the last received packet, and may be a part of the packets received by the server 1a; for instance, a plurality of received packets within the scope of the storable data amount.

The communication status column 205 stores communication status information showing the communication status with the client terminal 4; for example, the window size of TCP (Transmission Control Protocol) showing the data size that can be received by the client terminal 4, the maximum delay time in the case of measuring a plurality of delay times within a given period of time among the delay times up to the reception of an ACK (ACKnowledgement) signal showing that the client terminal 4 received the stream data after the server 1a sent such stream data, the communication band used in the most recent communication, and the number of times that the packets were resent.

The stream distribution unit 10 adds a row upon establishing a connection with the client terminal 4, and stores and records information in the distribution information column 201, the required band column 202 and the client terminal identifying information column 203. During stream distribution, the contents of the received packet column 204 and the communication status column 205 are updated at fixed intervals and, upon normally ending the communication with the client terminal 4 such as by receiving a stream distribution stop request from the client terminal 4, the communication status column 205 is updated to "Normal End."

The communication status notification unit 14 is used for notifying the communication status of the stream that is being distributed to the client terminal 4 to the server 1b in the standby operating mode. Specifically, the communication status notification unit 14 sends the connection management table 11 to the server 1b at given intervals. The cycle (interval) that the communication status notification unit 14 sends the connection management table 11 to the server 1b is preferably the same or roughly the same as the cycle (interval) that the stream distribution unit 10 updates the contents of the received packet column 204 and the communication status column 205.

The failure monitoring unit 15 is used for monitoring the occurrence of a failure in the server 1a. If the failure monitoring unit 15 detects a failure, it changes the operating mode of the server 1a from active to standby, and changes the operating mode of the server 1b from standby to active. As a method of changing the operating mode, for instance, an active flag is stored in the program memory 102 or the data memory 103, and the active flag is set to "1" when changing the operating mode to active and set to "0" when changing the operating mode to standby.

The network failure monitoring unit 17 is booted with the failure monitoring unit 15, and is used for monitoring the occurrence of a network-like failure in the network 5; that is, the occurrence of a network failure including a failure in the client terminal 4. If the network failure monitoring unit 17 detects a network failure, it performs failure analysis of the detected network failure.

The packet recording unit 18 is booted with the failure monitoring unit 15 or the network failure monitoring unit 17, and is used for acquiring a mirror packet, which is a copy of the packet sent from the client terminal 4 to the server 1a, from the router 2, and recording the acquired mirror packet. The packet recording unit 18 classifies the mirror packets acquired from the router 2 per connection by identifying the client terminal 4 as the source, and records or updates such mirror packets in the connection analysis table 19 described later. The packet recording unit 18 additionally buffers the mirror packets acquired from the router 2 to the packet buffer 20 described later provided in the primary storage apparatus 101, and records such mirror packets in the packet disk 31 of the external storage apparatus 3 at the timing described later. The amount of data to be buffered is set as the data amount that is just enough for the failure analysis of the network failure described later to be performed by the network failure monitoring unit 17, and any mirror packet exceeding such data amount is deleted from the packet recording unit 18. Incidentally, the amount of data to be buffered is preferably the data amount that is just enough for the failure analysis of the network failure, and greater than the data amount of the mirror packets received during the timeout time for the client terminal 4 to detect a network failure.

Figure 4:
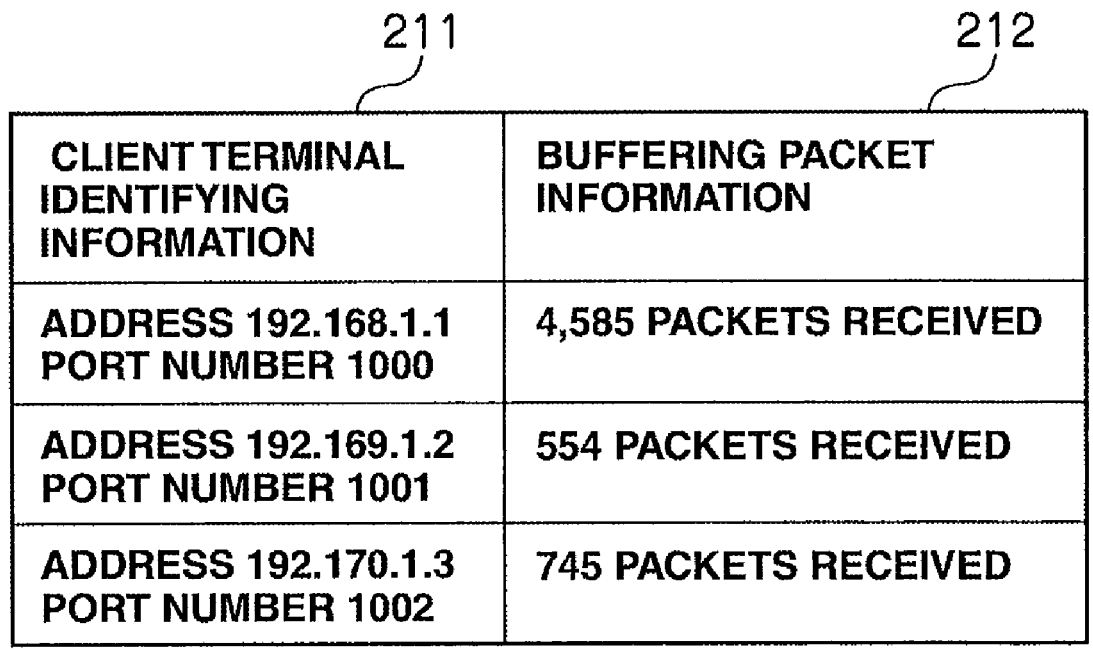
FIG. 4 is a configuration diagram explaining a connection analysis table shown in FIG. 1.

FIG. 4 is a configuration diagram explaining the connection analysis table shown in FIG. 1. The connection analysis table 19 is a table recording the result of the packet recording unit 18 receiving and analyzing the mirror packets copied with the router 2 and sent to the server 1b. The connection analysis table 19 is updated by the packet recording unit 18 upon updating the contents of the mirror packet that was buffered to the packet buffer 20 described later.

The connection analysis table 19 is configured from a client terminal identifying information column 211, and a buffering packet information column 212. The client terminal identifying information column 211 stores, as with the client terminal identifying information column 203 of the connection management table 11, identifying information for identifying the client terminal 4. The buffering packet information column 212 stores the number of received packets for managing what number the oldest mirror packet buffered to the primary storage apparatus 101 was received from the start of communication with the client terminal 4.

Figure 5:
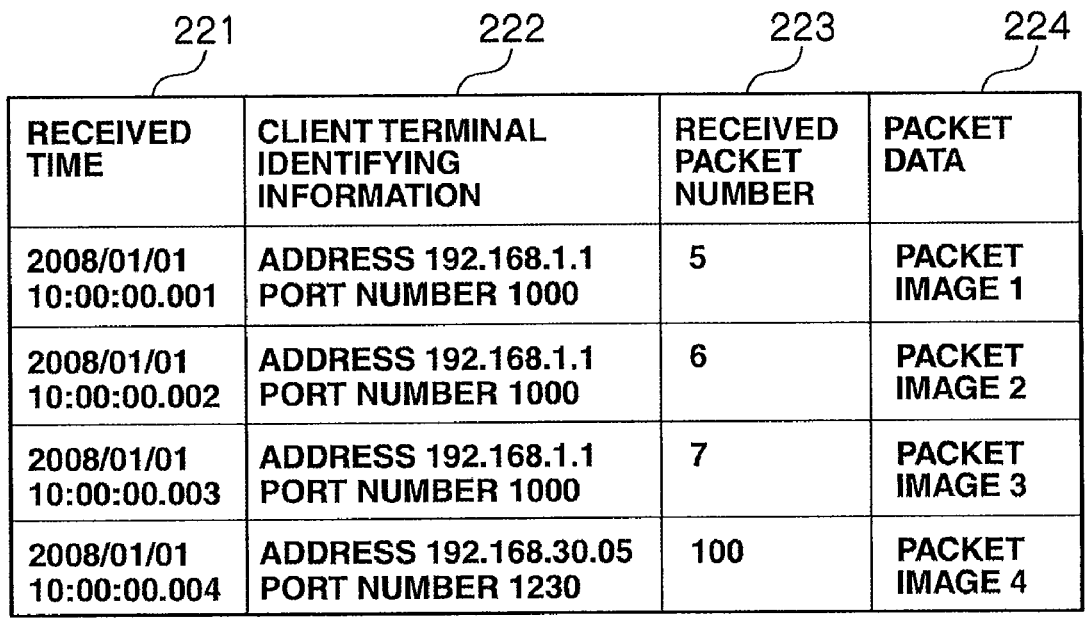
FIG. 5 is a configuration diagram explaining a packet buffer shown in FIG. 1.

FIG. 5 is a configuration diagram explaining the packet buffer shown in FIG. 1. The packet buffer 20 is configured from a reception time column 221, a client terminal identifying information column 222, a received packet number column 223, and a packet data column 224. The reception time column 221 stores the time that the mirror packet was received by the server 1b. The client terminal identifying information column 222 stores information of the source in the mirror packet. The received packet number column 223 stores the serial number of the mirror packet for each source stored in the client terminal identifying information column 222. The packet data column 224 stores the contents of the mirror packet received by the server 1b.

The operation of the stream distribution system is now explained with reference to FIG. 6 through FIG. 8.

Figure 6:
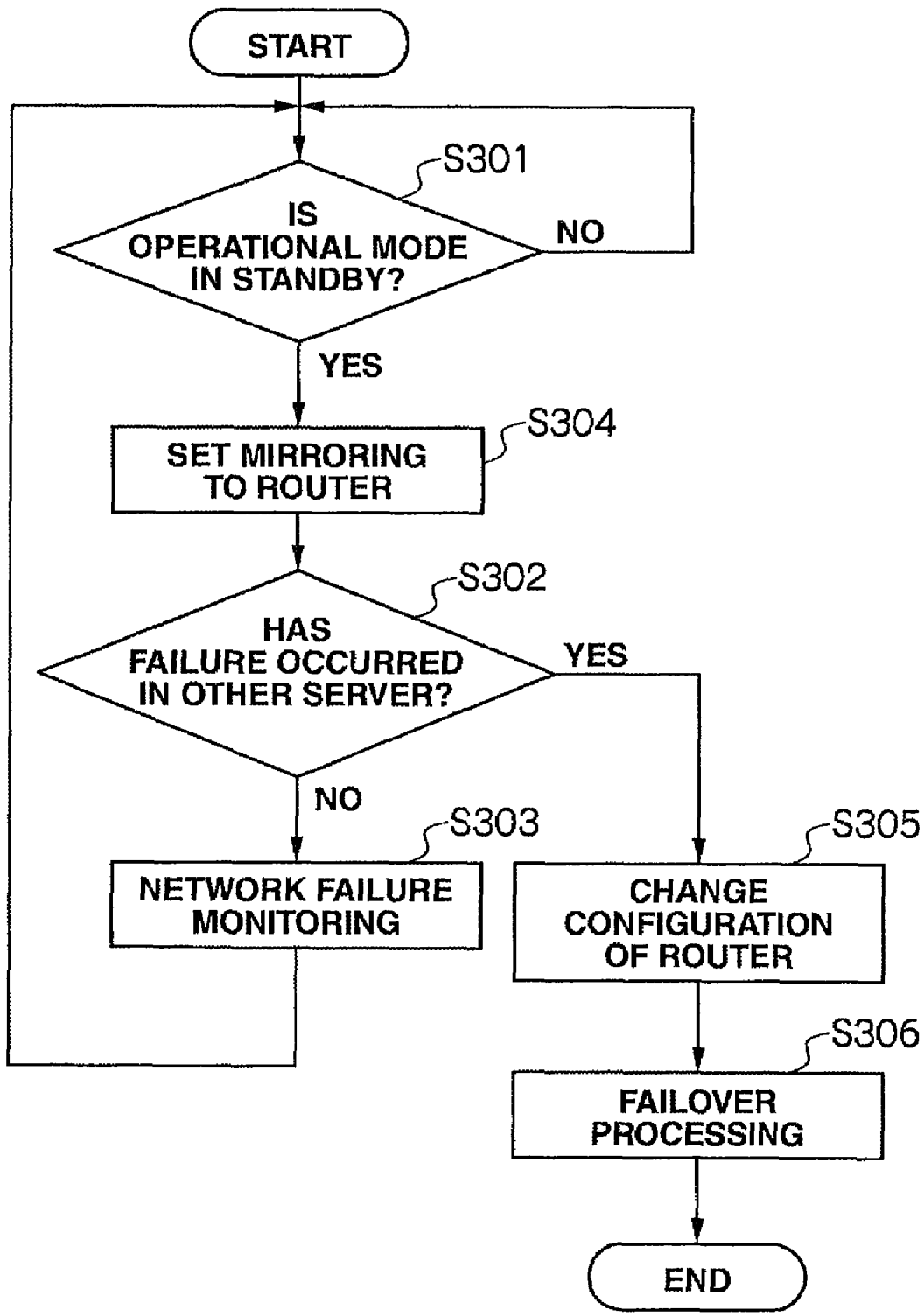
FIG. 6 is a flowchart explaining the operation of a failure monitoring unit shown in FIG. 1.

FIG. 6 is a flowchart explaining the operation of the failure monitoring unit shown in FIG. 1. The failure monitoring unit 15 determines whether the operating mode of the server 1b is standby based on the active flag described above (S301), continues the failure monitoring and proceeds to S302 if the operating mode is standby and, if the operating mode is not standby, repeats S301 until the operating mode becomes standby.

Subsequently, the failure monitoring unit 15 boots the packet recording unit 18, and the packet recording unit 18 sends a configuration change request to the router 2, and configures the router 2 so that the router 2 copies the packet to be sent to the server 1a and sends it to the server 1b (S304). Incidentally, if the router 2 has already been configured such as when executing S304 once again after the processing of S303 described later, the failure monitoring unit 15 skips S304.

Subsequently, the failure monitoring unit 15 determines whether a failure has occurred in the other server; namely, the server 1a (S302). As a method of determining whether a failure has occurred in the server, for instance, the following processing is executed.

Figure 7:
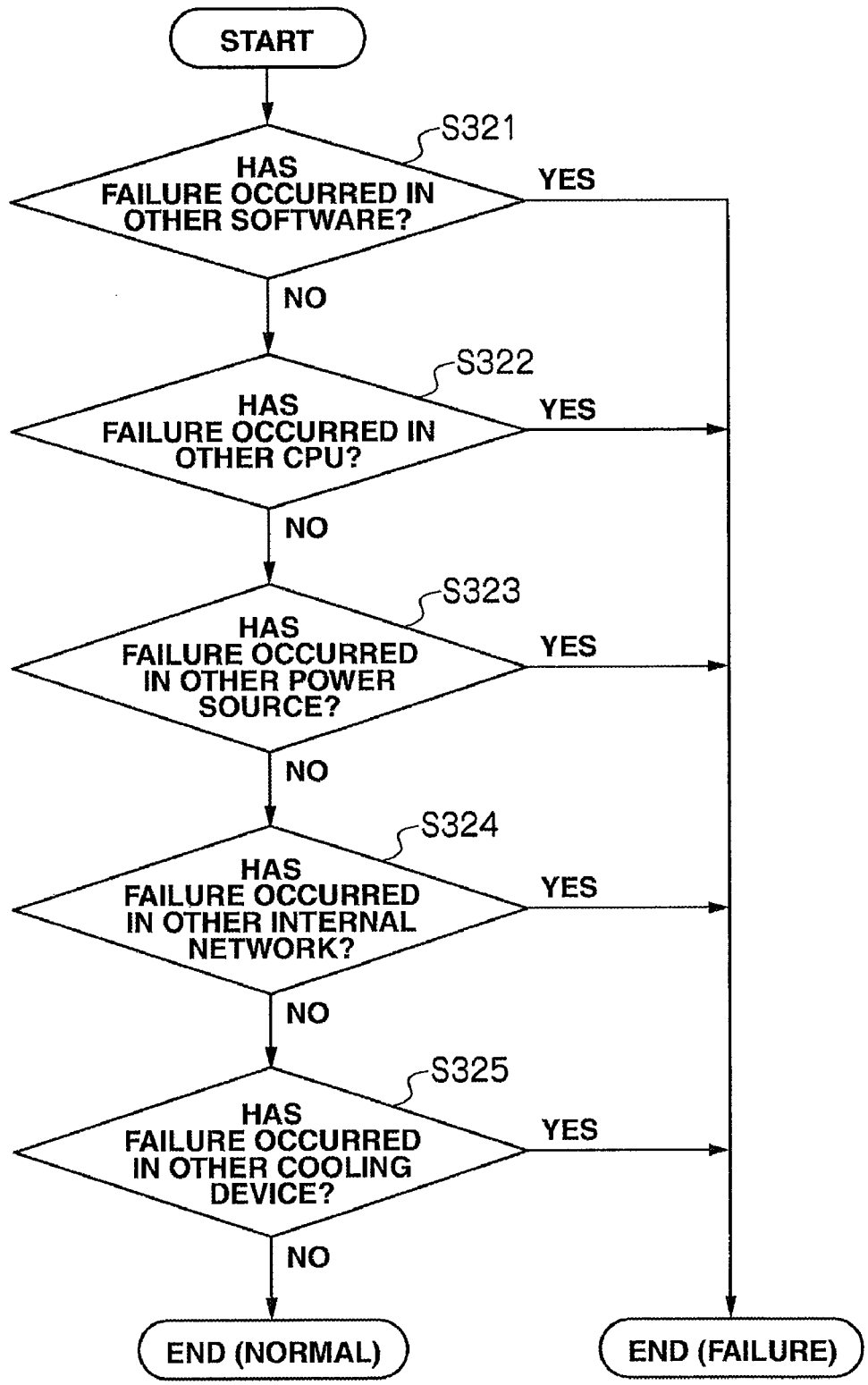
FIG. 7 is a flowchart explaining the operation pertaining to failure detection in the server.

FIG. 7 is a flowchart explaining the operation for detecting a failure in the server. Foremost, the failure monitoring unit 15 determines whether a failure has occurred in the software of the server 1a, such as the software not operating normally, based on whether there is a reply upon communicating with the software of the server 1a in given intervals (S321). If there is no failure in the software of the server 1a, the failure monitoring unit 15 connects the server 1a and the internal interface of the server 1b, and determines whether a failure has occurred in the CPU by monitoring the CPU's self-check result in the server 1a from the server 1b via the internal interface (S322). If there is no failure in the CPU of the server 1a, the failure monitoring unit 15 determines whether a failure has occurred in the power source, such as the power source of the server 1a not being a normal voltage, from the server 1b via the internal interface (S323). If there is no failure in the power source of the server 1a, the failure monitoring unit 15 makes an inquiry to the software of the server 1a to determine whether a failure has occurred in the internal network of the stream distribution system 9; for instance, whether a disconnection has occurred in the network cable 6b (S324). If there is no failure in the internal network, the failure monitoring unit 15 makes an inquiry to the software of the server 1a to determine whether a failure has occurred in the cooling system, such as the decrease in the rotating speed of the cooling fan (S325). If at least one failure has occurred at S321 to S325, the failure monitoring unit 15 detects the occurrence of a failure in the server 1a and ends this processing. If no failure has occurred at S321 to S325, the failure monitoring unit 15 does not detect the occurrence of a failure in the server 1a, and ends this processing on the assumption that the server 1a is normal.

If a failure has occurred in the server 1a as a result of the determination at S302, the failure monitoring unit 15 sends a configuration change request to the router 2 so that the server 1b can communicate with the client terminal 4, returns the configuration of the router 2 changed at S304 to the original configuration, and stops the packet recording unit 18 (S305). After stopping the packet recording unit 18, the failure monitoring unit 15 performs the so-called failover processing of changing the operating mode of the server 1a from active to standby, and changing the operating mode of the server 1b from standby to active (S306), and then ends and stops the processing of monitoring the occurrence of a failure. Thereby, the failure monitoring unit 15 of the server 1a is booted to monitor the occurrence of a failure in the server 1b in the active operating mode.

If it is possible to simultaneously send the mirror packet copied by the router 2 and send the stream data such as when there are a plurality of network cables 6a and network cables 6b connecting the router 2 with the server 1a and the server 1b, the failure monitoring unit 15 may omit the configuration change of the router 2 at S304 and S305.

If a failure has not occurred in the server 1a as a result of the determination at S302, the failure monitoring unit 15 boots the network failure monitoring unit 17, and the network failure monitoring unit 17 monitors the occurrence of a network failure.

Figure 8:
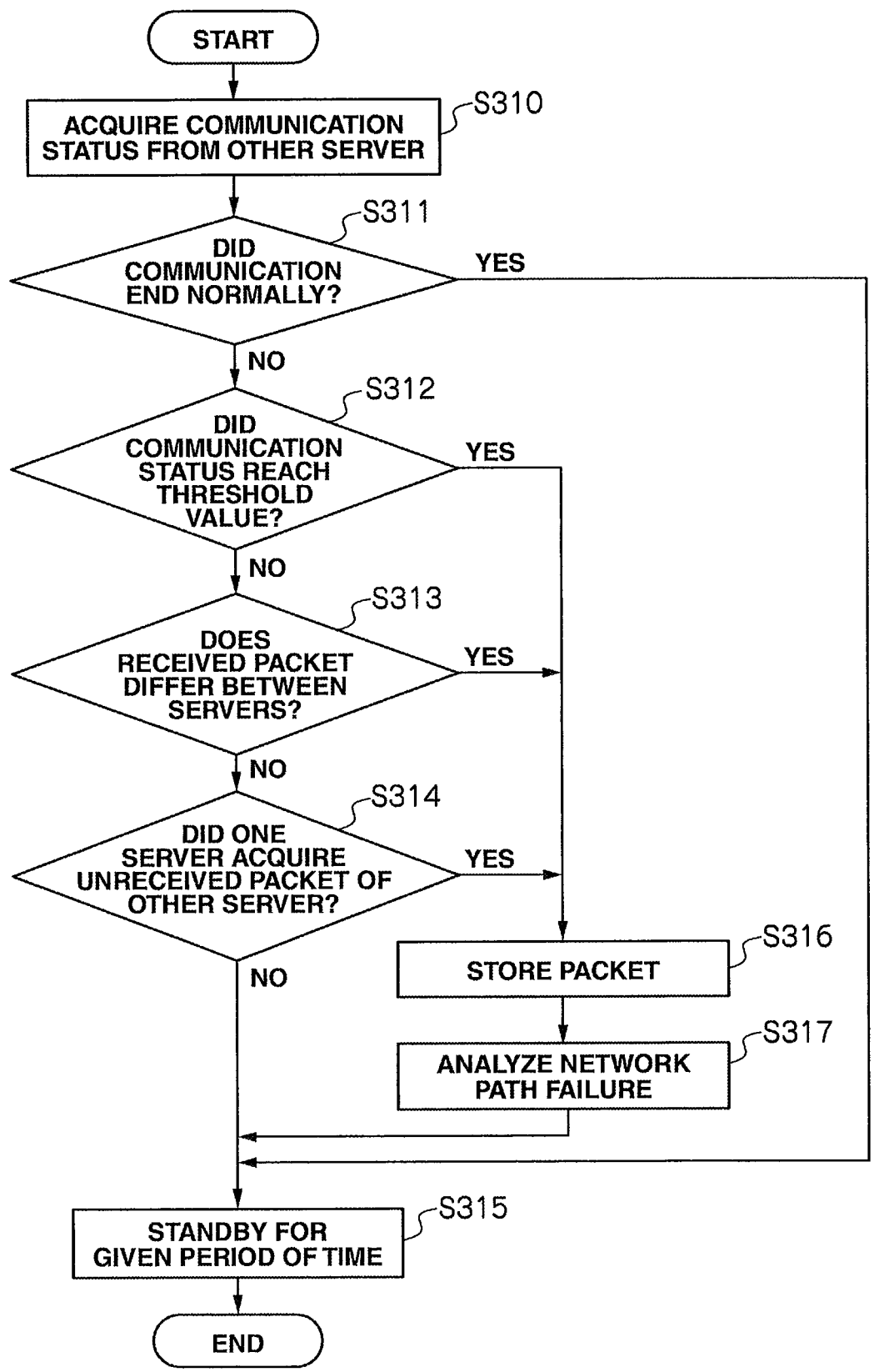
FIG. 8 is a flowchart explaining the operation of a network failure monitoring unit shown in FIG. 1.

FIG. 8 is a flowchart explaining the operation of the network failure monitoring unit shown in FIG. 1. Foremost, the network failure monitoring unit 17 acquires communication information concerning the communication with the client terminal 4 from the server 1a (S310). Specifically, the communication status notification unit 14 of the server 1a sends the contents of the connection management table 11, and the network failure monitoring unit 17 of the server 1b receives the contents of the connection management table 11 sent from the communication status notification unit 14.

Subsequently, the network failure monitoring unit 17 executes the following S311 to S314 to each row regarding the respective rows of the acquired connection management table 11.

Foremost, the network failure monitoring unit 17 determines whether the communication between the server 1a and the client terminal 4 ended normally based on whether the communication status column 205 of the connection management table 11 is "Normal End" (S311), proceeds to S315 if the communication between the server 1a and the-client terminal 4 ended normally, and proceeds to S312 if the communication did not end normally.

Subsequently, the network failure monitoring unit 17 determines whether each of indexes of the communication status information showing the communication status of the server 1a and the client terminal 4 stored in the communication status column 205 has reached a predetermined threshold value (S312). If an index showing the communication status of the network has reached a threshold value set for that index; for instance, if the window size of TCP becomes 0 when TCP is being used as the network protocol, if the difference between the time that the IP (Internet Protocol) packet of the server 1a was sent and the arrival time of the ACK signal corresponding to that IP packet becomes one second or longer, if the communication band of the past 10 seconds falls below the band of the required band column 202, if the number of resent packets exceeds 1, and so on may be considered. Like this, since the change in the communication status with the client terminal 4 is detected based on the communication status column 205, it is possible to detect the quality loss caused by a change in the communication status.

As a result of the determination at S312, the network failure monitoring unit 17 proceeds to S316 if the threshold value set to the respective indexes of the communication status information is reached, and proceeds to S313 is such threshold value is not reached.

Subsequently, the network failure monitoring unit 17 boots the packet recording unit 18, and the packet recording unit 18 searches for the contents of the received packet column 204 in the packet buffer 20. Specifically, the packet recording unit 18 searches for a row in which information of the client terminal identifying information column 203 and information of the client terminal identifying information column 222 coincide, and in which the number of received packets of the received packet column 204 and the serial number of the mirror packet of the received packet number column 223 coincide, from the packet buffer 20. The packet recording unit 18 thereafter acquires the contents of the mirror packet of the packet data column 224 in the searched row, and determines whether the acquired contents of the mirror packet of the packet data column 224 differ from the packet information of the received packet column 204 (S313). Like this, since a change in the reception status of the packets sent to the server 1*a* before a prescribed point in time is detected based on the number of received packets of the received packet column 204 and the packet information, it is possible to detect the omission of reception (packet drop) of the packets in the server 1*a* before a prescribed point in time.

As a result of the determination at S313, the network failure monitoring unit 17 proceeds to S316 if the contents of the mirror packet of the packet data column 224 in the searched line differ from the packet information stored in the received packet column 204, and proceeds to S314 when they coincide. Incidentally, the network failure monitoring unit 17 also proceeds to S314 if there is no row corresponding to the packet buffer 20 as a result of searching the packet buffer 20.

Subsequently, the packet recording unit 18 searches for a row in which information of the client terminal identifying information column 203 and information of the client terminal identifying information column 222 coincide, and the serial number of the mirror packet of the received packet number column 223 is greater than the number of received packets of the received packet column 204 from the packet buffer 20, and determines whether the difference in the time of the reception time column 221 in the searched row and the reception time of the received packet column 204 is greater than a given period of time (S314). Like this, since a change in the reception status of the packets sent to the server 1*a* after a prescribed point in time is detected based on the number of received packets of the received packet column 204 and the packet information, it is possible to detect the omission of reception (packet drop) of the packets in the server 1*a* after a prescribed point in time.

As a result of the determination at S314, the network failure monitoring unit 17 proceeds to S316 if the difference in the time of the reception time column 221 in the searched line and the reception time of the received packet column 204 is greater than a given period of time. The given period of time is the standby time at S315 described later. The network failure monitoring unit 17 also proceeds to S316 if there is no line corresponding to the packet buffer 20 as a result of the searching the packet buffer 20.

After performing the foregoing S311 to S314 to each row of the connection management table 11, the network failure monitoring unit 17 stands by for a given period of time (S315). This given period of time is preferably several seconds or so.

Here, if the determination at S312 is true (Yes), there is a possibility that some kind of failure occurred in the network 5 between the server 1*a* and the client terminal 4 or in the client terminal 4 itself, and the server 1*a* is free from any problems. Moreover, if the determination at S313 or S314 is true (Yes), there is a possibility that the server 1*a* could not receive all the packets. Like this, since a failure is detected in the network 5 between the server 1*a* and the client terminal 4 based on the connection management table 11 as communication information concerning the communication between the server 1*a* and the client terminal 4, and the packet buffer 20 buffered with the mirror packet as a copy of the packet sent to the server 1*a*, the server 1*b* is able to detect quality loss caused by a network failure based on the connection management table 11 and the packet buffer 20, and differentiate a network failure from other failures.

Subsequently, the packet recording unit 18 stores the mirror packet buffered to the packet buffer 20 in the packet disk 31 (S316). It is thereby possible to record differentiating information of a network failure and other failures.

Subsequently, the network failure monitoring unit 17 uses the client terminal identifying information column 211 of the connection analysis table 19 to perform failure analysis of the network 5 (S317). As a method of performing failure analysis to the network 5, a failure analysis method employing an ICMP (Internet Control Message Protocol) packet may be considered. This method sequentially increases the maximum hop count of the IP packet like 1, 2, 3, sends a plurality of ICMP packets to the network address of the client terminal stored in the client terminal identifying information column 211, and statistically measures the reply count. It is thereby possible to know up to what number hop destination router communication is possible, and acquire the packet loss ratio for performing failure analysis of the network. Like this, since a network failure is analyzed when such network failure is detected and an ICMP packet or the like is sent to the network 5 upon analyzing the network failure, it is possible to minimize the traffic increase of the network 5 caused by the analysis of the network failure.

The network failure monitoring unit 17 proceeds to S315 after S317 and, after the lapse of a given period of time, the network failure monitoring unit 17 ends the processing of monitoring the occurrence of a network failure, returns to the flowchart shown in FIG. 6, and the failure monitoring unit 15 repeats S301 to S306 once again.

Like this, according to the present invention, since a failure is detected in the network 5 between the server 1*a* and the client terminal 4 based on the connection management table 11 as communication information concerning the communication between the server 1*a* and the client terminal 4, and the packet buffer 20 buffered with the mirror packet as a copy of the packet sent to the server 1*a*, the server 1*b* is able to detect quality loss caused by a network failure based on the connection management table 11 and the packet buffer 20, and differentiate a network failure from other failures. Thereby, it is possible to narrow the scope of cause of quality loss, and the cause of quality loss in stream distribution can be easily identified. Moreover, since the server 1*b* having the same level of performance as the server 1*a* detects the network failure, a network failure can be analyzed without requiring a sophisticated failure analyzer as with the conventional art.

Further, since the mirror packet is stored in the packet disk 31 upon detecting a network failure, it is possible to record differentiating information of a network failure and other failures. Thus, it is no longer necessary to capture and check vast amounts of packets with a large distribution band or check the amount of packet capture by restricting such amount for a given period of time or under given conditions as with a conventional failure analyzer, and it is possible to only store the packets that are required for the failure analysis.

In addition, when changing the operating mode of the server 1*b* from standby to active and distributing stream data to the client terminal 4, the server 1*b* stops the failure monitoring unit 15. Thus, by changing the operating mode of the server 1*a* from active to standby, the failure monitoring unit 15 of the server 1*a* is booted to monitor the occurrence of a failure in the server 1*b* in the active operating mode.

Moreover, since the connection management table 11 includes the communication status column 205 for storing communication status information showing the communication status with the client terminal 4, it is possible to detect a change in the communication status with the client terminal 4 based on the communication status column 205. It is thereby possible to detect the quality loss caused by a change in the communication status, and further differentiate a network failure from other failures.

Further, since the connection management table 11 includes the received packet column 204 storing reception information showing the reception status of data sent to the server 1a, it is possible to detect a change in the reception status of packets set to the server 1a based on the received packet column 204, and further possible to detect the omission of reception (packet drop) of packets in the server 1a. It is thereby possible to differentiate a packet drop of packets from other failures.

In addition, since a network failure is analyzed when such network failure is detected and an ICMP packet or the like is sent to the network 5 upon analyzing the network failure, it is possible to minimize the traffic increase of the network 5 caused by the analysis of the network failure.

Incidentally, the configuration and operation of the present invention are not limited to the foregoing embodiment, and may be variously modified within a scope that does not deviate from the gist of the present invention.

What is claimed is:

1. A stream distribution system, comprising:
   a first stream distribution server for communicating with a client terminal via a network apparatus and sending stream data; and
   a second stream distribution server configured as a redundant server of the first stream distribution server and connected to the first stream distribution server;
   wherein the first stream distribution server includes:
   a send unit configured to send communication information concerning the communication with the client terminal to the second stream distribution server; and
   wherein the second stream distribution server includes:
   an acquisition unit configured to acquire mirror data, which is a copy of data sent to the first stream distribution server, from the network apparatus; and
   a network failure detection configured to detect a failure in a network between the first stream distribution server and the client terminal based on the communication information and the mirror data,
   wherein the second stream distribution server further includes an analysis unit configured to analyze a failure in the network when a failure is detected in the network.

2. The stream distribution system according to claim 1, wherein the second stream distribution server further includes a storage unit configured to store the mirror data when a failure is detected in the network.

3. The stream distribution system according to claim 1, wherein the second stream distribution server further includes:
   a server failure detection unit configured to detect a failure in the first stream distribution server;
   a stream distribution configured to send the stream data to the client terminal when a failure is detected in the first stream distribution server; and
   a stop unit configured to stop the server failure detection unit upon sending the stream data to the client terminal.

4. The stream distribution system according to claim 1, wherein the communication information includes communication status information showing the communication status with the client terminal.

5. The stream distribution system according to claim 1,
   wherein the communication information includes reception information showing the reception status of the data sent from the first stream distribution server; and
   wherein the second stream distribution server further includes a reception omission detection unit configured to detect the omission of reception of the data sent to the first stream distribution server based on the communication information and the mirror data.

6. A failure detection method for use in a system including a first stream distribution server for communicating with a client terminal via a network apparatus and sending stream data, and a second stream distribution server configured as a redundant server of the first stream distribution server and connected to the first stream distribution server, comprising:
   a send step of the first stream distribution server sending communication information concerning the communication with the client terminal to the second stream distribution server;
   an acquisition step of the second stream distribution server acquiring mirror data, which is a copy of data sent to the first stream distribution server, from the network apparatus; and
   a network failure detection step of the second stream distribution server detecting a failure in a network between the first stream distribution server and the client terminal based on the communication information and the mirror data,
   wherein the network failure detection step further includes an analytical step of the second stream distribution server analyzing a failure in the network when a failure is detected in the network.

7. The failure detection method according to claim 6,
   wherein the network failure detection step further includes a storage step of the second stream distribution server storing the mirror data when a failure is detected in the network.

8. The failure detection method according to claim 6,
   wherein the acquisition step further includes:
   a server failure detection step of the second stream distribution server detecting a failure in the first stream distribution server;
   a stream distribution step of the second stream distribution server sending the stream data to the client terminal when a failure is detected in the first stream distribution server; and
   a stop step of the second stream distribution server stopping the server failure detection unit upon sending the stream data to the client terminal.

9. The failure detection method according to claim 6,
   wherein the communication information includes communication status information showing the communication status with the client terminal.

10. The failure detection method according to claim 6,
    wherein the communication information includes reception information showing the reception status of the data sent from the first stream distribution server; and
    wherein the network failure detection step further includes a reception omission detection of the second stream distribution server detecting the omission of reception of the data sent to the first stream distribution server based on the communication information and the mirror data.

* * * * *